United States Patent
Bezdecny et al.

(10) Patent No.: US 9,188,504 B2
(45) Date of Patent: Nov. 17, 2015

(54) METHODS FOR TESTING TURBINE BLADES

(71) Applicant: General Electric Company, Schenectady, NY (US)

(72) Inventors: Michelle Rene Bezdecny, Centreville, VA (US); Michael Evans Graham, Slingerlands, NY (US); Michael Lee Bartholomew, Spring, TX (US)

(73) Assignee: General Electric Company, Niskayuna, NY (US)

( * ) Notice: Subject to any disclaimer, the term of this patent is extended or adjusted under 35 U.S.C. 154(b) by 264 days.

(21) Appl. No.: 13/665,364

(22) Filed: Oct. 31, 2012

(65) Prior Publication Data

US 2014/0115892 A1    May 1, 2014

(51) Int. Cl.
*G01M 15/14* (2006.01)
*B21D 53/78* (2006.01)
*G01M 13/00* (2006.01)
*G05B 13/04* (2006.01)
*F01D 5/08* (2006.01)
(Continued)

(52) U.S. Cl.
CPC ............ *G01M 13/00* (2013.01); *B23H 9/10* (2013.01); *B23P 15/02* (2013.01); *F01D 5/085* (2013.01); *G05B 13/041* (2013.01); *Y10T 29/49341* (2015.01)

(58) Field of Classification Search
CPC .. B23K 26/03; B23K 26/032; B23K 26/0626; B23K 26/0635; B23H 9/10; B23H 7/20; B23P 15/02; B23P 25/04; F01D 5/18; F01D 5/183; F01D 5/085; F01D 5/08; F01D 25/12; B21D 53/78; G05B 13/027; G05B 13/0265; G05B 13/04; G05B 13/041

USPC ........ 29/889.7–889.722; 219/121.71, 121.69; 703/4; 73/112.01
See application file for complete search history.

(56) References Cited

U.S. PATENT DOCUMENTS

| 6,339,208 B1 * | 1/2002 | Rockstroh et al. ........ 219/121.71 |
| 6,339,879 B1 * | 1/2002 | Wheat et al. ............. 29/889.721 |
| 6,850,874 B1 | 2/2005 | Higuerey et al. |

(Continued)

FOREIGN PATENT DOCUMENTS

EP    2426319 A2    3/2012

OTHER PUBLICATIONS

R.Z. Liu, J. Kuang, Q. Gong, X.L. Hou. "Principal component regression analysis with SPSS". Computer Methods and Programs in Biomedicine 71, 2003 141-147.*

(Continued)

*Primary Examiner* — David Bryant
*Assistant Examiner* — Jun Yoo
(74) *Attorney, Agent, or Firm* — John P. Darling

(57) ABSTRACT

Methods for testing turbine blades. One method for testing turbine blades includes measuring dimensions of each of a first set of turbine blades. The method also includes testing airflow through first openings in each of the first set of turbine blades to determine airflow properties of each of the first set of turbine blades. The method includes determining a relationship between the dimensions and the airflow properties of each of the first set of turbine blades. The method includes measuring dimensions of each of a second set of turbine blades. The method also includes determining airflow properties for each of the second set of turbine blades based at least partially on the dimensions of the second set of turbine blades and the relationship.

16 Claims, 4 Drawing Sheets

(51) Int. Cl.
  *B23H 9/10* (2006.01)
  *B23P 15/02* (2006.01)

(56) References Cited

U.S. PATENT DOCUMENTS

| | | | |
|---|---|---|---|
| 7,685,870 | B2 | 3/2010 | Quinn et al. |
| 7,784,183 | B2 | 8/2010 | Rockstroh et al. |
| 8,056,403 | B2 | 11/2011 | Traverso et al. |

OTHER PUBLICATIONS

Friedrich, Craig. "Heat Affected Zone" Department of Mechanical Engineering—Engineering Mechanics, Michigan Technological University, Feb. 14, 2010 http://www.me.mtu.edu/~microweb/chap4/ch4-3.htm.*

Falcoz, C., A Comparative Study of Showerhead Cooling Performance, These No. 2735 (2003), Lausanne, EPFL (2003).

Grant Reinman, Timothy Ayer, Thomas Davan, Matthew Devore, Steven Finley, Jaime Glanovsky, Lauren Gray, Benjamin Hall, Charles (Chas) Jones, Amanda Learned, Erica Mesaros, Robert Morris, Sandra Pinero, Randel Russo, Ethan Stearns, Matthew Teicholz, Wendy Teslik-Welz & David Yudichak (2012) Design for Variation, Quality Engineering, 24:2, 317-345; http://dx.doi.org/10.1080/08982112.2012.651973.

Falcoz, C; Weigand, B; Ott, P; A comparative study on showerhead cooling performance, International Journal of Heat and Mass Transfer 49 (2006) 1274-1286.

Takahashi, Toshihiko 1 ; Watanabe, Kazunori; Takahashi, Takeshi; Thermal conjugate analysis of a first stage gas turbine blade; Mechanical Engineers, Transactions B66. 647 (Jul. 2000): 158-165.

* cited by examiner

METHODS FOR TESTING TURBINE BLADES

BACKGROUND

The subject matter disclosed herein relates to turbine blades and, more particularly, to methods for testing turbine blades.

Gas turbine engines typically include turbine blades that are gas-cooled. To facilitate gas-cooling, the turbine blades may include internal passages that route cooling gas to openings formed in the exterior surfaces of the turbine blades. Accordingly, the passages and openings enable thin films of cooling gas to flow about the exterior of the turbine blades. The sizes and shapes of the passages and openings of the turbine blades may vary from one turbine blade to the next. Therefore, airflow properties of each turbine blade are typically tested multiple times during the manufacturing process to ensure proper airflow around the turbine blades. Between airflow property tests, the passages and openings in the turbine blades may be occluded or modified due to problems that occur in the production process. Unfortunately, testing the airflow properties of each turbine blade multiple times during the manufacturing process may be time consuming and costly.

BRIEF DESCRIPTION

In accordance with one embodiment, a method for testing turbine blades includes measuring dimensions of each of a first set of turbine blades. The method also includes testing airflow through first openings in each of the first set of turbine blades to determine airflow properties of each of the first set of turbine blades. The method includes determining a relationship between the dimensions and the airflow properties of each of the first set of turbine blades. The method includes measuring dimensions of each of a second set of turbine blades. The method also includes determining airflow properties for each of the second set of turbine blades based at least partially on the dimensions of the second set of turbine blades and the relationship.

In accordance with another embodiment, a method for testing turbine blades includes determining a first relationship between dimensions of first openings in a first turbine blade and airflow properties of the first turbine blade. The method also includes determining a second relationship between dimensions of second openings in a second turbine blade and airflow properties of the second turbine blade. The method includes measuring dimensions of third openings in a third turbine blade. The method also includes determining airflow properties for the third turbine blade based at least partially on the dimensions of the third openings, the first relationship, and the second relationship. The method includes adjusting the dimensions of at least one of the third plurality of openings based at least partially on the determined airflow properties of the third turbine blade.

In accordance with a further embodiment, a method of manufacturing a turbine blade includes partially forming the turbine blade and forming openings in the partially formed turbine blade. The method also includes measuring dimensions of the turbine blade. The method includes determining airflow properties for the partially formed turbine blade based at least partially on the dimensions of the turbine blade and a predetermined relationship between blade dimensions and corresponding blade airflow properties.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements. The term "dimensions" is intended to represent one or more shape attributes measured that can include the extent between any two points on the interior or exterior surfaces of a turbine blade or other part, any spatial measurement, or any volumetric measurement including center of gravity.

Embodiments disclosed herein may substantially reduce time and costs associated with manufacturing and testing turbine blades. In certain embodiments, a method for testing turbine blades includes measuring dimensions of each of a first set of turbine blades. As may be appreciated, the dimensions of each of the first set of turbine blades may vary. The method also includes testing airflow through each of the first set of turbine blades to determine airflow properties of each of the first set of turbine blades. The airflow properties may be unique to each turbine blade based on the dimensions of each blade. The method further includes determining a relationship between the dimensions and the airflow properties of each of the first set of turbine blades. The relationship may be determined via statistical analysis, such as by a principle component analysis, by a linear regression analysis, by a non-linear regression analysis, or by a symbolic regression analysis. The method includes measuring dimensions of each of a second set of turbine blades. The airflow properties for each of the second set of turbine blades may be determined using the dimensions of the second set of turbine blades and the relationship. Accordingly, the second set of turbine blades may bypass certain testing procedures, thereby reducing manufacturing time and associated costs. As may be appreciated, the methods described herein are not limited to the manufacturing of turbine blades, but may be applied to manufacturing any suitable structure.

Figure 1:
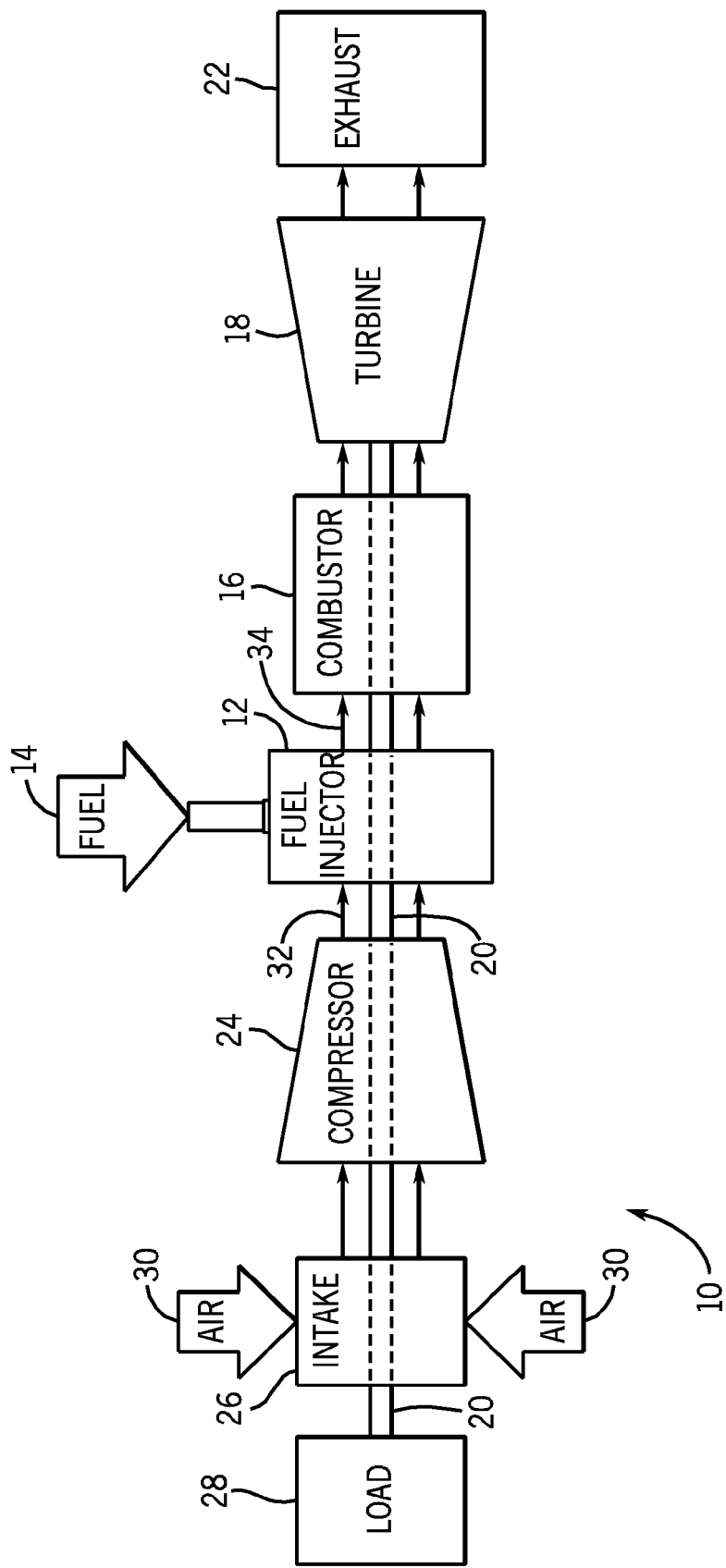
FIG. 1 is a block diagram of an embodiment of a turbine system which may employ turbine blades having film cooling holes.

FIG. 1 is a block diagram of an embodiment of a turbine system 10 which may employ turbine blades having film cooling holes. The turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As may be appreciated, the turbine 18 includes one or more stators having fixed vanes or blades, and one or more rotors having blades (e.g., turbine blades) which rotate relative to the stators. The exhaust gas passes through the turbine rotor blades, thereby driving the turbine rotor to rotate. Coupling between the turbine rotor and a shaft 20 causes the rotation of the shaft 20, which is also coupled to several components throughout the gas turbine system 10, as illustrated. Eventually, the exhaust of the combustion process exits the gas turbine system 10 via an exhaust outlet 22.

A compressor 24 includes blades rigidly mounted to a rotor which is driven to rotate by the shaft 20. As air passes through the rotating blades, air pressure increases, thereby providing the combustor 16 with sufficient air for proper combustion. The compressor 24 may intake air to the gas turbine system 10 via an air intake 26. Further, the shaft 20 may be coupled to a load 28, which may be powered via rotation of the shaft 20. As may be appreciated, the load 28 may be any suitable device that may use the power of the rotational output of the gas turbine system 10, such as a power generation plant or an external mechanical load. For example, the load 28 may include an electrical generator, a propeller of an airplane, and so forth. The air intake 26 draws air 30 into the gas turbine system 10 via a suitable mechanism, such as a cold air intake. The air 30 then flows through blades of the compressor 24, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As discussed above, the rotor of the turbine 18 includes turbine blades. The turbine blades may have film cooling holes to facilitate cooling of the turbine blades during operation of the turbine 18. During manufacturing of the turbine blades, the dimensions of the turbine blades may be measured (e.g., before and/or after the film cooling holes have been drilled). After the film cooling holes have been added, airflow through the film cooling holes may be tested to determine airflow properties. The measuring and testing steps may be performed multiple times while manufacturing the turbine blades. To facilitate manufacturing the turbine blades faster and with a reduced cost, a relationship between dimensions of the turbine blades and airflow properties may be determined. The determined relationship may be used to determine airflow properties of turbine blades using the dimensions of the turbine blades, thereby obviating certain airflow testing procedures. Thus, the turbine blades may be manufactured faster and with a reduced cost, as compared to turbine blades that are airflow-tested multiple times. As may be appreciated, the methods described herein may be applied to any type of turbine blade, such as to turbine blades used in any type of turbo machinery.

Figure 2:
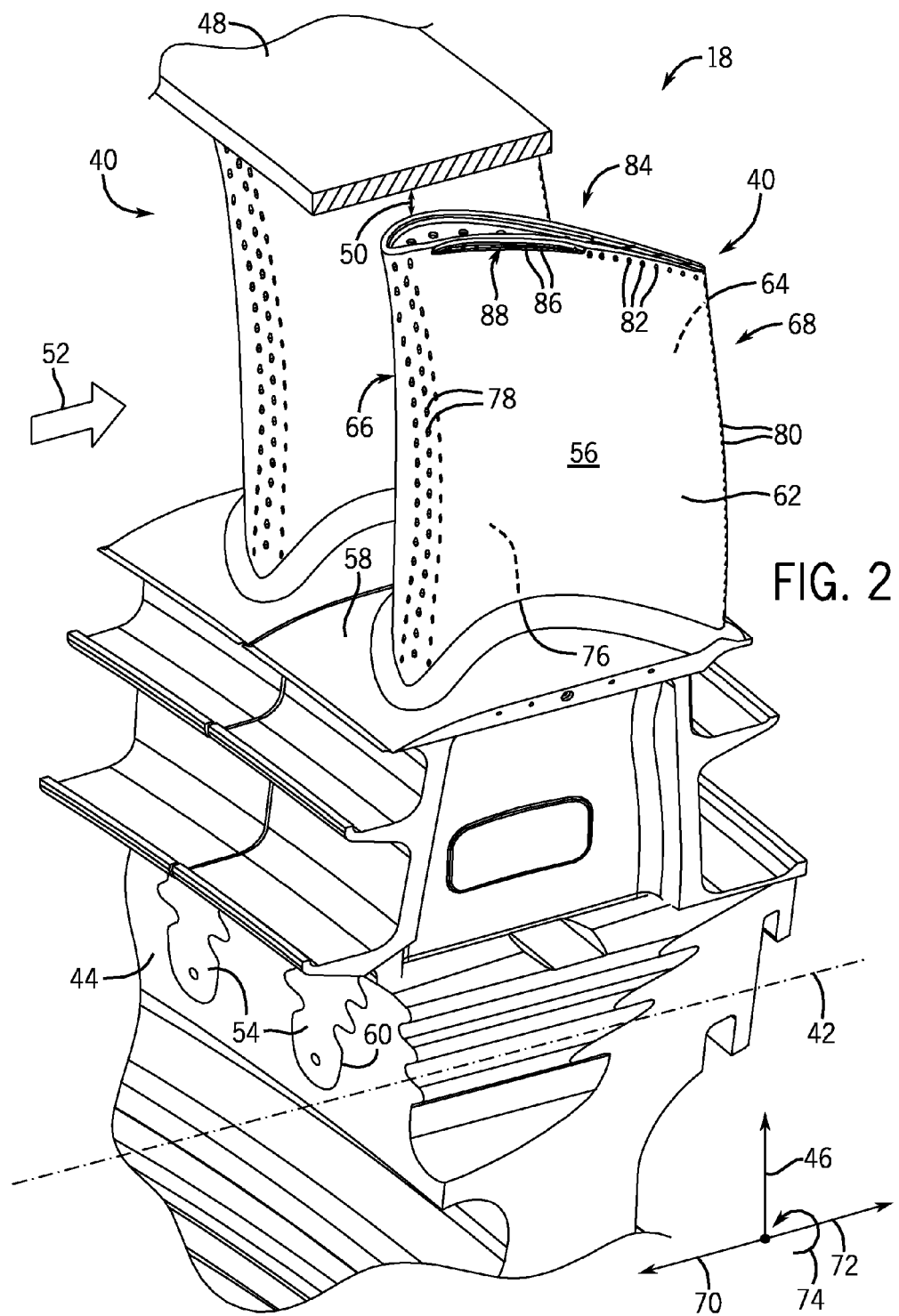
FIG. 2 is a perspective view of an embodiment of turbine blades having cooling holes.

FIG. 2 is a perspective view of an embodiment of turbine blades 40 of the turbine 18 of the turbine system 10. The turbine 18, which may be symmetrically arranged about a rotational axis 42, includes multiple circumferentially-spaced radial turbine blades 40 (i.e., turbine rotor blades or buckets). The blades 40 extend radially outwardly from a rotor disk 44 along a radial axis, as indicated by radial directional arrow 46. The turbine 18 also includes an annular turbine shroud 48 that surrounds the turbine blades 40. Generally, the turbine shroud 48 is configured to provide a relatively small clearance 50 (e.g., gap) between the turbine blades 40 and the shroud 48, thus limiting the leakage of combustion gases 52 therebetween during operation. As illustrated, each turbine blade 40 includes a rail 54, an airfoil 56, and a base 58. The rail 54 may be formed to have any suitable shape, such as an axial dovetail configured to be mounted in a corresponding dovetail shaped groove 60 along the perimeter of the rotor disk 44. The airfoil 56 may be integrally joined to the rail 54, and may extend radially therefrom. The base 58 may be formed at the junction of the airfoil 56 and the rail 54, and may define a portion of the flow path for the combustion gases 52. As may be appreciated, the turbine blades 40 may be formed by any suitable technique, including casting, machining, molding, and so forth.

In the illustrated embodiment, the airfoil 56 includes a generally concave pressure surface 62 and a circumferentially or laterally opposite suction surface 64, each of which extends axially between a leading edge 66 and a trailing edge 68 of the airfoil 56. As illustrated, the leading edge 66 refers to the edge on an upstream side (e.g., along a direction 70) of the turbine blade 40, and the trailing edge 68 refers to the edge on a downstream side (e.g., along a direction 72) of the turbine blade 40 with respect to the direction of the combustion gas flow. Moreover, the pressure surface 62 and the suction surface 64 are spaced apart in a circumferential direction 74 to form a hollow interior cavity 76 that defines at least one internal flow chamber, or channel, for channeling cooling fluid (e.g., air) through the airfoil 56 to cool the turbine blade 40. In certain embodiments, the interior of the cavity 76 may include a number of structures to enhance cooling, such as serpentine flow channels, turbulators, and so forth. As may be appreciated, in certain embodiments, the cooling air may be bled from the compressor 24 or supplied from another coolant source. The cooling air received by the cavity 76 is discharged through film cooling holes 78 (e.g., openings) and trailing edge discharge holes 80 (e.g., openings). Cooling air may also be discharged through additional cooling holes 82 (e.g., openings) near a blade tip 84 along the pressure surface 62 and/or through cooling holes 86 (e.g., openings) located on a butt shelf 88 formed on the pressure surface 62.

The cooling holes 78, 82, and 86 may influence the flow of the combustion gases 52 through the turbine 18. Accordingly, dimensions of the cooling holes 78, 82, and 86 are measured during manufacturing to ensure that the size of the cooling holes 78, 82, and 86 are within a suitable tolerance. Further, airflow properties of each turbine blade 40 are determined by testing airflow through each of the turbine blades 40 prior to installation of the blades in the turbine 10. A manufacturing process for manufacturing turbine blades 40 may include measuring and testing each turbine blade 40 multiple times. By determining a relationship between dimensions and the airflow properties of a corresponding set of turbine blades 40, the airflow properties of other turbine blades 40 may be calculated thereby obviating certain airflow testing procedures. As such, the duration and costs associated with manufacturing turbine blades may be reduced.

Figure 3:
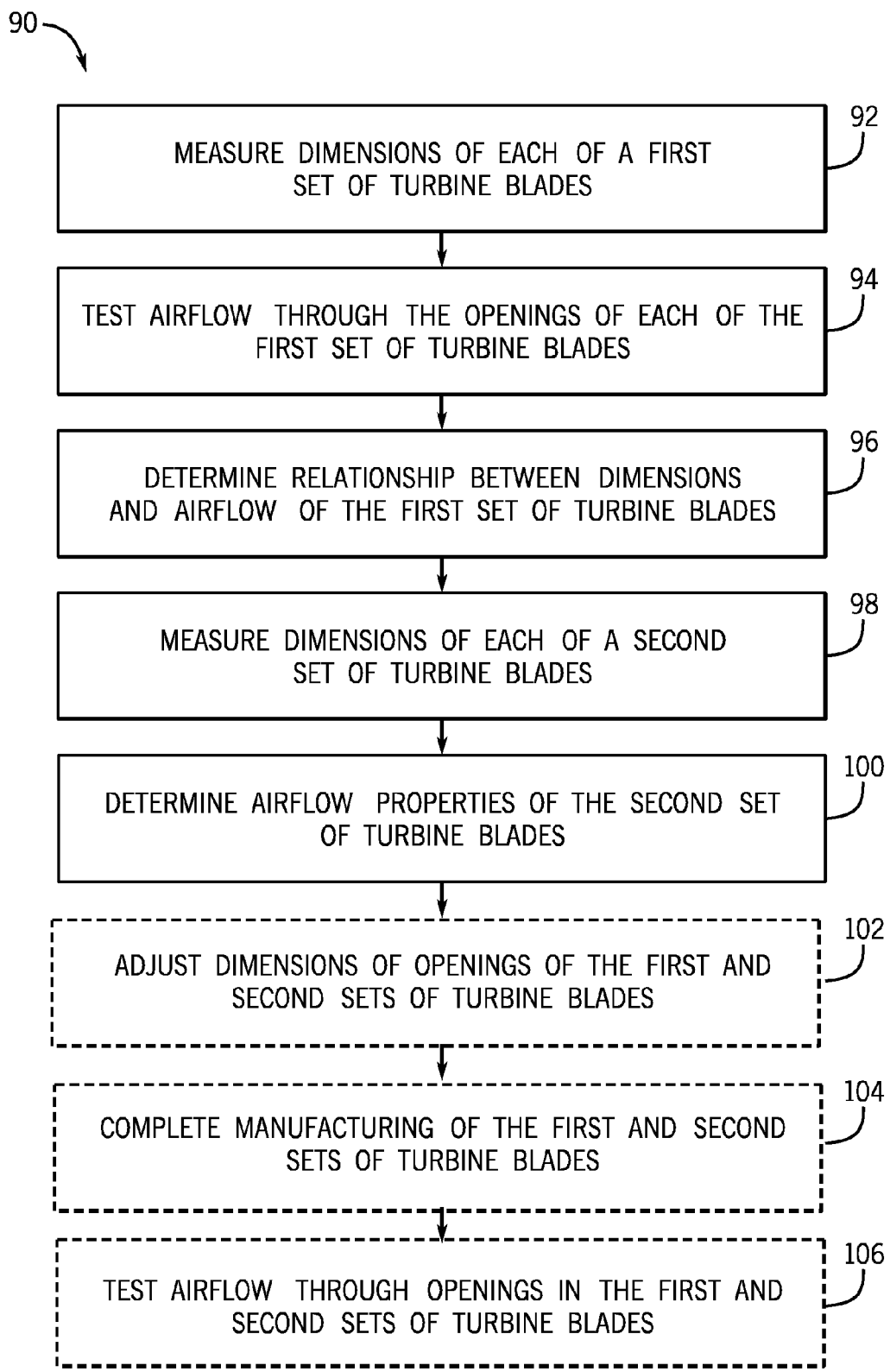
FIG. 3 is a flow diagram of an embodiment of a method for testing turbine blades having cooling holes.

FIG. 3 is a flow diagram of an embodiment of a method 90 for testing turbine blades 40 having cooling holes 78, 82, and 86 (e.g., openings). During manufacturing of the turbine blades 40, dimensions (e.g., sizes, shapes, areas, diameters, thicknesses, positions, masses, weights, material densities, centers of gravity, distance between two points, sizes of openings, shapes of openings, diameters of openings, positions of openings, dimensions of walls, etc.) of each of a first set of turbine blades 40 is measured (block 92). Such dimensions may be measured using any suitable measuring device or method. For example, the dimensions may be measured using a coordinate measuring machine (CMM), an optical scanning system, an ultrasound system, an x-ray system, and so forth. In certain embodiments, other properties of the turbine blades 40 may be measured. These properties may relate to time of fluid passage through the turbine blades 40, electrical parameters, and so forth. Moreover, airflow through the openings of the first set of turbine blades 40 is tested to determine airflow properties of each of the first set of turbine blades 40 (block 94). For example, airflow through a first turbine blade 40 may be tested to determine airflow properties of the first turbine blade 40. Further, airflow through a second turbine blade 40 may be tested to determine airflow properties of the second turbine blade 40. Each turbine blade 40 of the first set of turbine blades 40 may be tested accordingly.

A relationship between the measured dimensions and the airflow properties of each turbine blade 40 of the first set of turbine blades 40 is determined (block 96). The relationship between the measured dimensions and the airflow properties may be determined using any suitable method. For example, the relationship may be determined using a statistical analysis technique, such as principle component analysis (PCA), linear regression, non-linear regression, or symbolic regression.

In one example of PCA, measured dimensions and airflow properties of each turbine blade 40 of the first set of turbine blades 40 may be transformed into a set of values of linearly uncorrelated variables (e.g., principal components). The principle components may be used to determine airflow and/or other properties of turbine blades 40 in which there are unknown values.

As may be appreciated, a relationship between measured dimensions and any suitable property of the turbine blades 40 may be determined. For example, a relationship between measured dimensions and thermal emissivity of a turbine blade, airflow velocity through the openings, vibration of a turbine blade, frequency of vibration of a turbine blade, stress on a turbine blade, strain on a turbine blade, and so forth may be determined.

Dimensions of each of a second set of turbine blades 40 is measured (block 98). The airflow properties for each of the second set of turbine blades 40 is determined using the measured dimensions and the previously determined relationship (block 100). For example, the dimensions of one turbine blade 40 of the second set of turbine blades 40 may be input as variables into one or more computations, and the outputs from the one or more computations may be the airflow properties for the respective turbine blade 40. It should be noted that when the airflow properties for each of the second set of turbine blades 40 is determined using the measured dimensions and the relationship, the airflow properties for each of the second set of turbine blades 40 need not be tested. Therefore, the number of tests performed on the second set of turbine blades 40 may be reduced. As may be appreciated, the first and second sets of turbine blades 40 may be partially manufactured when flow properties are determined, such that further manufacturing steps may be performed before manufacturing of the turbine blades 40 is complete. For example, in certain embodiments, dimensions of the openings and/or walls of the openings of each of the first and second sets of turbine blades 40 may be adjusted based on the measured and/or determined airflow properties (block 102).

Manufacturing of the first and second sets of turbine blades 40 may be completed in any suitable manner (block 104). For example, manufacturing of the first and second sets of turbine blades 40 may be completed by adjusting dimensions of the openings and/or walls of the openings of each of the turbine blades 40, applying a turbine blade coating, and so forth. After manufacturing of the first and second sets of turbine blades 40 is completed, each blade of the first set of turbine blades 40 and each blade of the second set of turbine blades 40 may be tested to determine a final set of airflow properties for each of the turbine blades 40 (block 106). However, as discussed above, testing of the partially manufactured second set of turbine blades 40 may be obviated because the airflow properties at the intermediate stage of manufacturing may be determined based on the relationship between the dimensions of the first set of turbine blades 40 and the airflow properties of the first set of turbine blades 40. Accordingly, the time to manufacture the second set of turbine blades 40 and costs associated therewith may be reduced.

Figure 4:
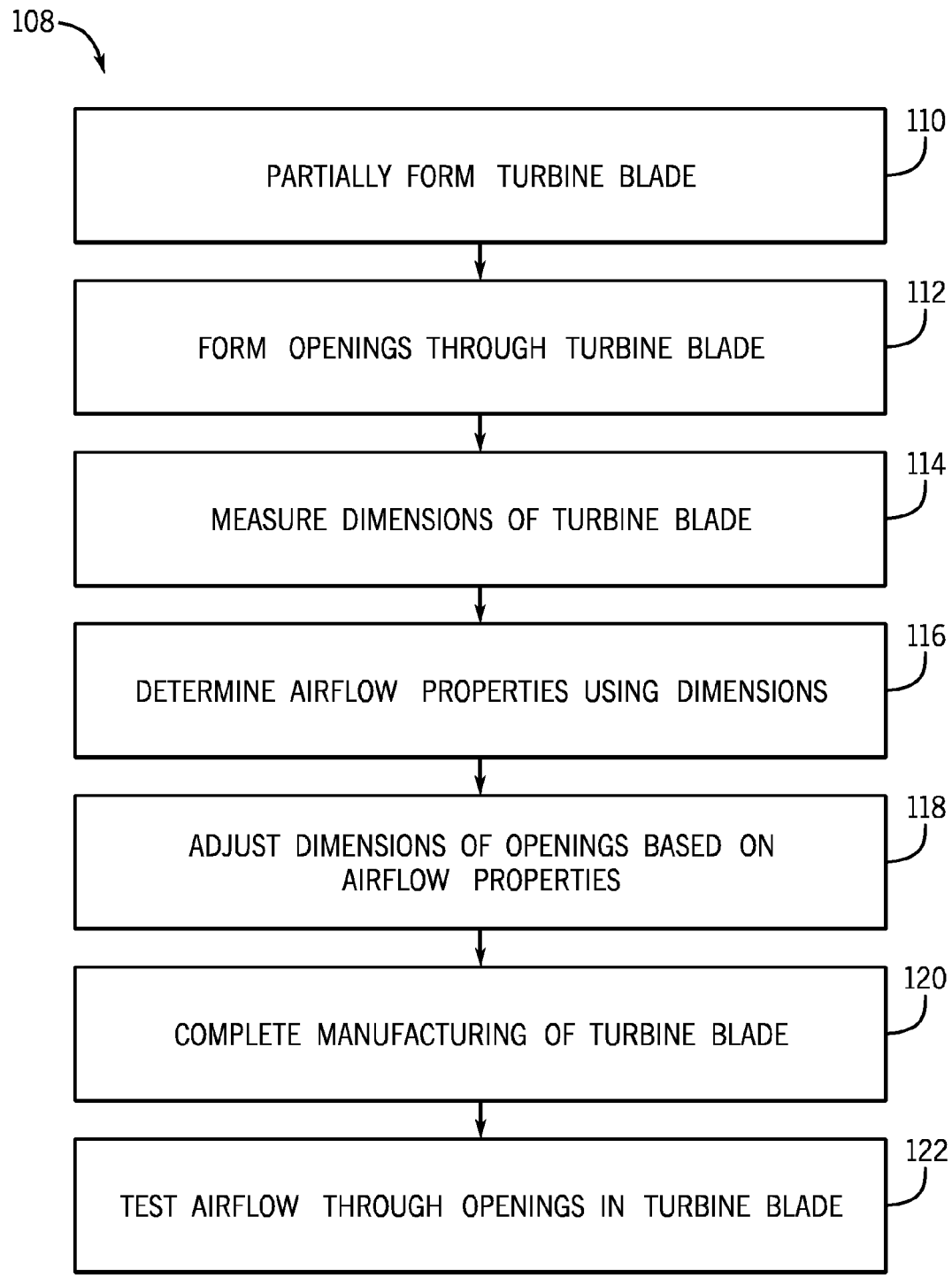
FIG. 4 is a flow diagram of an embodiment of a method for manufacturing a turbine blade having cooling holes.

FIG. 4 is a flow diagram of an embodiment of a method 108 for manufacturing the turbine blade 40 having cooling holes 78, 82, and 86 (e.g., openings). During manufacturing of a turbine blade 40, the turbine blade 40 is partially formed (block 110). For example, the turbine blade 40 may be formed into a general shape via a mold, a casting, and so forth. The partially formed turbine blade 40 has openings (e.g., cooling holes 78, 82, and 86) formed therein to facilitate cooling of the turbine blade 40 during operation (block 112). After the openings are formed in the turbine blade 40, dimensions of the turbine blade 40 are measured (block 114). In certain embodiments, the dimensions of the turbine blade 40 may be measured before the openings are formed in the turbine blade 40. Airflow properties of the partially formed turbine blade 40 may be determined using the measured dimensions and a predetermined relationship between blade dimensions and corresponding airflow properties (block 116). The predetermined relationship may be determined, as discussed above, by using a statistical analysis technique, such as principle component analysis, linear regression, non-linear regression, or symbolic regression.

For example, the predetermined relationship may be determined using a principle component analysis. Such a principle component analysis may be performed by the following steps. Measuring airflow properties for a set of turbine blades. Measuring a set of dimensional measurements for each turbine blade in the set of turbine blades. In one example the measurements may be organized into a table as illustrated in TABLE 1.

TABLE 1

| Turbine Blade | Airflow | M1 | M2 | M3 | M4 | M5 |
|---|---|---|---|---|---|---|
| TB1 | 0.010 | 0.20 | 0.45 | 1.20 | 0.11 | 0.14 |
| TB2 | 0.015 | 0.20 | 0.30 | 0.41 | 0.12 | 0.13 |
| TB3 | 0.010 | 0.15 | 0.35 | 0.60 | 0.09 | 0.11 |

As illustrated, TB1, TB2, and TB3 represent turbine blades. The Airflow column represents one airflow property. M1, M2, M3, M4, and M5 represent a set of dimensional measurements for each turbine blade. To predict the airflow for a turbine blade not in the original set of turbine blades, the measurements (e.g., M1, M2, M3, M4, and M5) are used as Xs and the Airflow column values are used as Ys (e.g., the Xs and Ys having a Y=f(X) relationship). Accordingly, the Xs are inserted into a predictive function and the value of the functional relationship is the predicted airflow.

In one embodiment, the measurements may be pre-processed to improve the quality of the predictive model. For example, when using principal component analysis, the measurements may be pre-processed to represent the measurements in the form of their principal components as illustrated in TABLE 2.

TABLE 2

| Turbine Blade | Airflow | PC1 | PC2 | PC3 | PC4 |
|---|---|---|---|---|---|
| TB1 | 0.010 | 0.22 | 0.43 | 0.99 | 0.01 |
| TB2 | 0.015 | 0.20 | 0.22 | 0.70 | 0.30 |
| TB3 | 0.010 | 0.23 | 0.45 | 0.95 | 0.09 |

In this table PC1, PC2, PC3, and PC4 represent locations of each turbine blade along each axis of the principle component coordinate system. Thus, the Airflow column values in TABLE 2 become the Ys, and any number of commonly used methods (e.g., linear, non-linear, symbolic regression, etc.) may be used to derive functional relationships between the values in the PC columns and the Airflow column. Accordingly, to predict the airflow for a turbine blade not in the original set, the measurements are used to generate the location of the part in the principle component space. The resulting principle component values (e.g., PC1, PC2, PC3, PC4) are substituted into the predictive function and the value of the functional relationship is the predicted airflow.

Dimensions of the openings and/or walls of the openings may be adjusted based on the airflow properties of the partially formed turbine blade 40 (block 118). Thereafter, manufacturing of the partially formed turbine blade 40 may be completed (block 120). For example, the partially formed turbine blade 40 may be coated to complete manufacturing of the turbine blade 40. After manufacturing of the turbine blade 40 is complete, airflow through the openings of the turbine blade 40 may be tested to determine a final set of airflow properties of the turbine blade 40 (block 122).

Technical effects of the invention include determining a relationship between dimensions of turbine blades 40 and airflow properties of the turbine blades 40. The relationship may be determined using a statistical analysis technique, such as principle component analysis, linear regression, non-linear regression, or symbolic regression. Using the determined relationship, various testing steps may be obviated because airflow properties may be determined by computations/algorithms instead of being obtained through testing. Accordingly, time and costs associated with manufacturing turbine blades 40 may be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for testing turbine blades, comprising:
measuring dimensions of each of a first plurality of turbine blades;
testing airflow through a first plurality of openings in each of the first plurality of turbine blades to determine airflow properties of each of the first plurality of turbine blades;
determining a relationship between the dimensions and the airflow properties of each of the first plurality of turbine blades by performing a principle component analysis;
measuring dimensions of each of a second plurality of turbine blades; and
determining airflow properties for each of the second plurality of turbine blades based at least partially on the dimensions of the second plurality of turbine blades and the relationship, wherein determining the relationship comprises correlating a set of locations of each turbine blade along each axis of a principle component coordinate system with one measured airflow property of each turbine blade and deriving a functional relationship between the locations and the measured airflow properties.

2. The method of claim 1, wherein the functional relationship is derived by linear, non-linear, or symbolic regression.

3. A method of manufacturing turbine blades, comprising:
partially forming a plurality of turbine blades;
forming a plurality of openings in each partially formed turbine blade;
and
testing the plurality of turbine blades according to the method of claim 1.

4. The method of claim 3, further comprising adjusting dimensions of at least one of the plurality of openings of at least one partially formed turbine blade based on the airflow properties, and completing manufacturing of the at least one partially formed turbine blade after adjusting the dimensions of the at least one opening.

5. The method of claim 4, further comprising testing airflow through the plurality of openings in the at least one turbine blade after completing the manufacturing of the at least one partially formed turbine blade.

6. The method of claim 1, wherein the dimensions comprise at least one sizes, shapes, areas, diameters, thicknesses, positions, masses, weights, material densities, centers of gravity, distance between two points, sizes of openings, shapes of openings, diameters of openings, positions of openings, or dimensions of walls.

7. The method of claim 1, further comprising:
determining a relationship between the dimensions and at least one of thermal emissivity of each of the first plurality of turbine blades, vibration of each of the first plurality of turbine blades, frequency of vibration of each of the first plurality of turbine blades, stress on each of the first plurality of turbine blades, or strain on each of the first plurality of turbine blades.

8. The method of claim 1, wherein the first plurality of turbine blades and the second plurality of turbine blades comprise partially manufactured turbine blades.

9. The method of claim 1, further comprising adjusting, the dimensions of at least one of a second plurality of openings of one of the second plurality of turbine blades based at least partially on the airflow properties of a corresponding turbine blade of the second plurality of turbine blades.

10. The method of claim 1, wherein measuring dimensions comprises measuring at least one of a wall thickness, a distance between two points, a center of gravity, a diameter of each opening, a shape of each opening, an area of each opening, and material densities.

11. The method of claim 1, wherein determining the airflow properties for each of the second plurality of turbine blades does not include testing an airflow through a second plurality of openings in each of the second plurality of turbine blades.

12. The method of claim 1, further comprising determining a second relationship between the dimensions of the first plurality of turbine blades and at least one of thermal properties, a center of gravity, a weight, and electrical properties, of each of the first plurality of turbine blades.

13. The method of claim 1, comprising adjusting the dimensions of at least one of the first plurality of openings based at least partially on the airflow properties of a corresponding turbine blade of the first plurality of turbine blades.

14. The method of claim 1, comprising completing manufacturing of the first plurality of turbine blades and the second plurality of turbine blades.

15. The method of claim 14, further comprising testing airflow through the first plurality of openings in each of the first plurality of turbine blades, and testing airflow through the second plurality of openings in each of the second plurality of turbine blades after completing the manufacturing of the first plurality of turbine blades and the second plurality of turbine blades.

16. The method of claim 1, wherein determining the relationship between the dimensions of the first plurality of the first turbine blades and the airflow properties of the first plurality of turbine blades comprises correlating a set of dimensional measurements for each turbine blade with one measured airflow property of each turbine blade.

\* \* \* \* \*